US012620013B2

(12) United States Patent (10) Patent No.: US 12,620,013 B2
Ieta et al. (45) Date of Patent: May 5, 2026

(54) INFORMATION PROCESSING APPARATUS AND INFORMATION PROCESSING METHOD

(71) Applicant: ZOZO, Inc., Chiba (JP)

(72) Inventors: Tsuyoshi Ieta, Chiba (JP); Kouki Minowa, Chiba (JP)

(73) Assignee: ZOZO, INC., Chiba (JP)

( * ) Notice: Subject to any disclaimer, the term of this patent is extended or adjusted under 35 U.S.C. 154(b) by 70 days.

(21) Appl. No.: 18/611,123

(22) Filed: Mar. 20, 2024

(65) Prior Publication Data

US 2024/0232973 A1 Jul. 11, 2024

Related U.S. Application Data

(63) Continuation of application No. PCT/JP2022/035837, filed on Sep. 27, 2022.

(30) Foreign Application Priority Data

Sep. 30, 2021 (JP) ................................. 2021-162368

(51) Int. Cl.
*G06Q 30/00* (2023.01)
*G06Q 30/016* (2023.01)
*G06Q 30/0601* (2023.01)
(52) U.S. Cl.
CPC ....... *G06Q 30/0627* (2013.01); *G06Q 30/016* (2013.01)
(58) Field of Classification Search
CPC .......... G06Q 30/0601; G06Q 30/0623; G06Q 30/0631; G06Q 30/06311;

(Continued)

(56) References Cited

U.S. PATENT DOCUMENTS 5,930,769 A * 7/1999 Rose ...................... G06Q 30/06
705/26.81
6,201,546 B1 * 3/2001 Bodor ...................... G06T 7/97
345/620

(Continued)

FOREIGN PATENT DOCUMENTS

JP 2007-265077 A 10/2007
JP 2011-095906 A 5/2011

(Continued)

OTHER PUBLICATIONS

Huang, Shan, Zhi Wang, and Yong Jiang. "Guess your size: A hybrid model for footwear size recommendation." Advanced Engineering Informatics 36 (2018): 64-75. (Year: 2018).*

(Continued)

*Primary Examiner* — Christopher B Seibert
(74) *Attorney, Agent, or Firm* — Oliff PLC

(57) ABSTRACT

Further improvement of service suitable for a foot size of a target user based on evaluations of a plurality of sizes is promoted. An information processing apparatus includes an identification section, a generation section, and a provision section. The identification section identifies an allowable range of sizes of specific footwear that is allowable for at least one specific user based on evaluation information on a plurality of sizes of the specific footwear evaluated by the specific user. The generation section generates first correlation information indicating a first correlation between the allowable range identified by the identification section and a foot size of the specific user. The provision section provides service according to a foot size of a target user based on the first correlation information generated by the generation section.

10 Claims, 8 Drawing Sheets

(58) Field of Classification Search
CPC ......... G06Q 30/06312; G06Q 30/0641; G06Q
30/0643; G06Q 30/06443
See application file for complete search history.

(56) References Cited

U.S. PATENT DOCUMENTS

| | | | | |
|---|---|---|---|---|
| 6,344,853 | B1* | 2/2002 | Knight | G06Q 30/02 345/629 |
| 6,546,309 | B1* | 4/2003 | Gazzuolo | G06T 17/20 702/167 |
| 10,046,234 | B2* | 8/2018 | Perdigón Rodriguez | G06F 3/016 |
| 2002/0126132 | A1* | 9/2002 | Karatassos | G06T 19/00 345/586 |
| 2003/0076318 | A1* | 4/2003 | Shaw-Weeks | A41H 1/00 345/419 |
| 2007/0005174 | A1* | 1/2007 | Thomas | G06Q 30/02 700/132 |
| 2007/0011173 | A1 | 1/2007 | Agostino | |
| 2007/0027564 | A1* | 2/2007 | Walters | G06Q 10/06 703/1 |
| 2007/0130020 | A1* | 6/2007 | Paolini | G06Q 30/0631 705/26.62 |
| 2007/0162348 | A1* | 7/2007 | Lewis | G06Q 30/0605 705/17 |
| 2008/0163344 | A1* | 7/2008 | Yang | G06Q 30/0201 705/7.29 |
| 2008/0255920 | A1* | 10/2008 | Vandergriff | G06Q 30/0601 705/26.1 |
| 2009/0094138 | A1 | 4/2009 | Sweitzer et al. | |
| 2009/0115777 | A1* | 5/2009 | Reyers Moreno | G06T 17/30 348/121 |
| 2010/0061596 | A1* | 3/2010 | Mostafavi | G06T 7/248 382/209 |
| 2010/0063419 | A1* | 3/2010 | Mostafavi | A61B 5/1135 600/587 |
| 2010/0306082 | A1* | 12/2010 | Wolper | G06Q 30/0603 345/619 |
| 2011/0022639 | A1* | 1/2011 | Martinsson | G06F 16/2228 707/E17.012 |
| 2011/0099002 | A1 | 4/2011 | Sasaki et al. | |
| 2012/0022978 | A1* | 1/2012 | Manea | G06Q 30/0603 705/27.2 |
| 2013/0215116 | A1* | 8/2013 | Siddique | G06Q 20/40 705/26.7 |
| 2013/0311324 | A1* | 11/2013 | Stoll | G06Q 30/0635 705/26.7 |
| 2014/0108202 | A1 | 4/2014 | Masuko | |
| 2014/0114620 | A1* | 4/2014 | Grinspun | A41H 3/007 703/1 |
| 2014/0168217 | A1* | 6/2014 | Kim | G06Q 30/0643 345/420 |
| 2014/0368499 | A1* | 12/2014 | Kaur | G06T 19/20 345/420 |
| 2015/0088687 | A1* | 3/2015 | Lin-Hendel | G06Q 30/0603 705/26.8 |
| 2015/0154691 | A1* | 6/2015 | Curry | G06Q 30/0631 705/27.2 |
| 2016/0284017 | A1* | 9/2016 | Almog | G06T 7/60 |
| 2017/0004567 | A1* | 1/2017 | Dutt | G06Q 30/0643 |
| 2017/0098271 | A1* | 4/2017 | Chen | H04L 67/04 |
| 2018/0084078 | A1* | 3/2018 | Yan | H04L 67/63 |
| 2019/0266656 | A1* | 8/2019 | Watkins | G06Q 30/0631 |
| 2019/0332866 | A1* | 10/2019 | Beall | H04N 23/698 |
| 2019/0377955 | A1* | 12/2019 | Swaminathan | G06N 3/0475 |
| 2021/0090449 | A1* | 3/2021 | Smith | G06Q 30/02 |
| 2021/0345733 | A1 | 11/2021 | Maezawa | |
| 2022/0071341 | A1* | 3/2022 | Hilario | A43B 7/24 |
| 2024/0119502 | A1 | 4/2024 | Kusano et al. | |

FOREIGN PATENT DOCUMENTS

| | | | |
|---|---|---|---|
| JP | 5256362 | B1 | 8/2013 |
| JP | 2018-101259 | A | 6/2018 |
| JP | 2019-045305 | A | 3/2019 |
| JP | 2020-154475 | A | 9/2020 |
| WO | 91/17677 | A1 | 11/1991 |
| WO | 2011162760 | A1 | 12/2011 |

OTHER PUBLICATIONS

Oct. 4, 2022 International Search Report for Patent Application No. PCT/JP2022/027898.
U.S. Appl. No. 18/411,779, filed Jan. 12, 2024 in the name of Ieta et al.
U.S. Appl. No. 18/413,316, filed Jan. 16, 2024 in the name of Ieta et al.
Oct. 4, 2022 International Search Report for Patent Application No. PCT/JP2022/027899.
Nov. 29, 2022 International Search Report for Patent Application No. PCT/JP2022/035837.
Jun. 5, 2025 Non-Final Office Action received in U.S. Appl. No. 18/411,779.

* cited by examiner

| SPECIFIC USER ID | SPECIFIC FOOTWEAR | EVALUATION INFORMATION | ... |
|---|---|---|---|
| U11 | SPECIFIC FOOTWEAR AA1 | EVALUATION INFORMATION #11 | ... |
| U12 | SPECIFIC FOOTWEAR AA2 | EVALUATION INFORMATION #12 | ... |
| ... | ... | ... | ... |

| SPECIFIC USER ID | ATTRIBUTE | MEASUREMENT INFORMATION | ... |
|---|---|---|---|
| U11 | AGE: 30 YEARS, SEX: MALE | MEASUREMENT INFORMATION #11 | ... |
| U12 | AGE: 30 YEARS, SEX: FEMALE | MEASUREMENT INFORMATION #12 | ... |
| ... | ... | ... | ... |

| PRODUCT ID | PRODUCT INFORMATION | ... |
|---|---|---|
| IT11 | PRODUCT INFORMATION #11 | ... |
| IT12 | PRODUCT INFORMATION #12 | ... |
| ... | ... | ... |

INFORMATION PROCESSING APPARATUS AND INFORMATION PROCESSING METHOD

CROSS REFERENCE TO RELATED APPLICATIONS

This application is a continuation of International Patent Application No. PCT/JP2022/035837, having an international filing date of Sep. 27, 2022, which designated the United States, the entirety of which is incorporated herein by reference. Japanese Patent Application No. 2021-162368 filed on Sep. 30, 2021 is (are) also incorporated herein by reference in its entirety.

BACKGROUND OF THE INVENTION

Conventionally known techniques propose articles such as clothing or footwear suitable for users. For example, Japanese Patent No. 5256362 discloses a conventional technique that proposes a size of a specific product suitable for a user based on evaluations of sizes of the specific product by other users.

Unfortunately, conventional techniques fail to promote further improvement of service according to a foot size of a target user based on evaluations of a plurality of sizes. For example, the conventional techniques fail to provide service based on whether a certain size of the plurality of sizes fits the feet of the target user.

BRIEF DESCRIPTION OF THE DRAWINGS

FIG. 5 is a table illustrating an example of an evaluation information storage section according to the embodiment.

FIG. 6 is a table illustrating an example of a measurement information storage section according to the embodiment.

DETAILED DESCRIPTION

Figure 1:
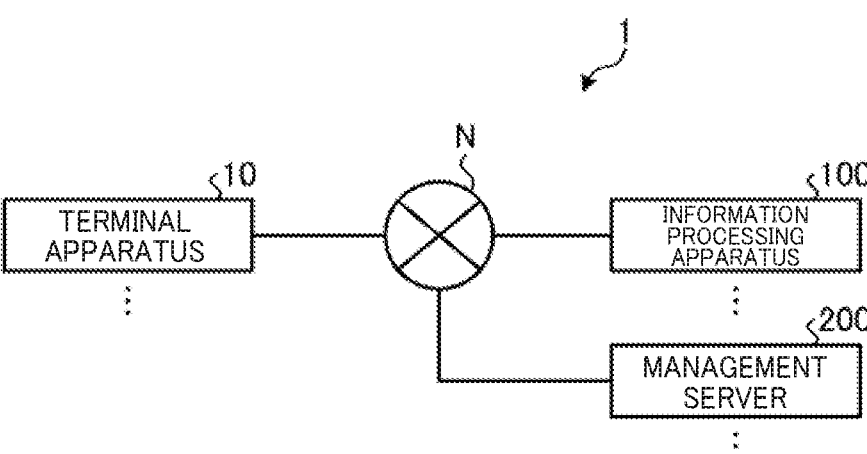
FIG. 1 is a diagram illustrating a configuration example of an information processing system according to an embodiment.

The following disclosure provides many different embodiments, or examples, for implementing different features of the provided subject matter. These are, of course, merely examples and are not intended to be limiting. In addition, the disclosure may repeat reference numerals and/ or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

One embodiment of the present application is an information processing apparatus comprising at least one processor or circuit comprising: an identification section configured to identify an allowable range of sizes of specific footwear that is allowable for at least one specific user based on evaluation information on a plurality of sizes of the specific footwear evaluated by the specific user; a generation section configured to generate first correlation information indicating a first correlation between the allowable range identified by the identification section and a foot size of the specific user; and a provision section configured to provide service according to a foot size of a target user based on the first correlation information generated by the generation section.

The other embodiment of the present application is an information processing method executed by a computer, the method comprising: an identification step of identifying an allowable range of sizes of specific footwear that is allowable for at least one specific user based on evaluation information on a plurality of sizes of the specific footwear evaluated by the specific user; a generation step of generating first correlation information indicating a first correlation between the allowable range identified by the identification step and a foot size of the specific user; and a provision step of providing service according to a foot size of a target user based on the first correlation information generated by the generation step.

Exemplary embodiments are described below. Note that the following exemplary embodiments do not in any way limit the scope of the content defined by the claims laid out herein. Note also that all of the elements described in the present embodiment should not necessarily be taken as essential elements A detailed mode (hereinafter referred to as an "embodiment") for implementing an information processing apparatus, an information processing method, and an information processing program according to the present disclosure is described below with reference to the drawings. However, this embodiment does not constitute any limitation to the information processing apparatus, the information processing method, and the information processing program according to the present disclosure. In addition, identical sections in embodiments below are denoted by identical reference signs, and duplicate description is omitted.

Embodiment

1. Configuration of Information Processing System

An information processing system 1 shown in FIG. 1 is described. As shown in FIG. 1, the information processing system 1 includes a terminal apparatus 10, an information processing apparatus 100, and a management server 200. The terminal apparatus 10, the information processing apparatus 100, and the management server 200 are communicably connected by wired or wireless via a predetermined communication network (network N). FIG. 1 is a diagram illustrating a configuration example of the information processing system 1 according to the embodiment. The information processing system 1 shown in FIG. 1 may include a plurality of terminal apparatuses 10, a plurality of information processing apparatuses 100 and a plurality of management servers 200.

The terminal apparatus 10 is an information processing apparatus used by a specific user. The terminal apparatus 10 may be any type of apparatus if it can implement processing according to the embodiment. The terminal apparatus 10 may be an apparatus such as a smartphone, a tablet terminal, a notebook computer, a desktop computer, a mobile phone, or a PDA. In an example shown in FIG. 2, the terminal apparatus 10 is a smartphone.

For example, the terminal apparatus 10 is a smart device such as a smartphone and a tablet, and is a portable terminal apparatus that can communicate with an arbitrary server apparatus via a wireless communication network of 3rd generation (3G), long term evolution (LTE) or the like. The terminal apparatus 10 may include a screen such as a liquid crystal display having a touch panel function so as to receive various operations from the specific user, such as tap operation, slide operation, or scroll operation by a finger, a stylus, or the like on displayed data such as content.

Figure 2:
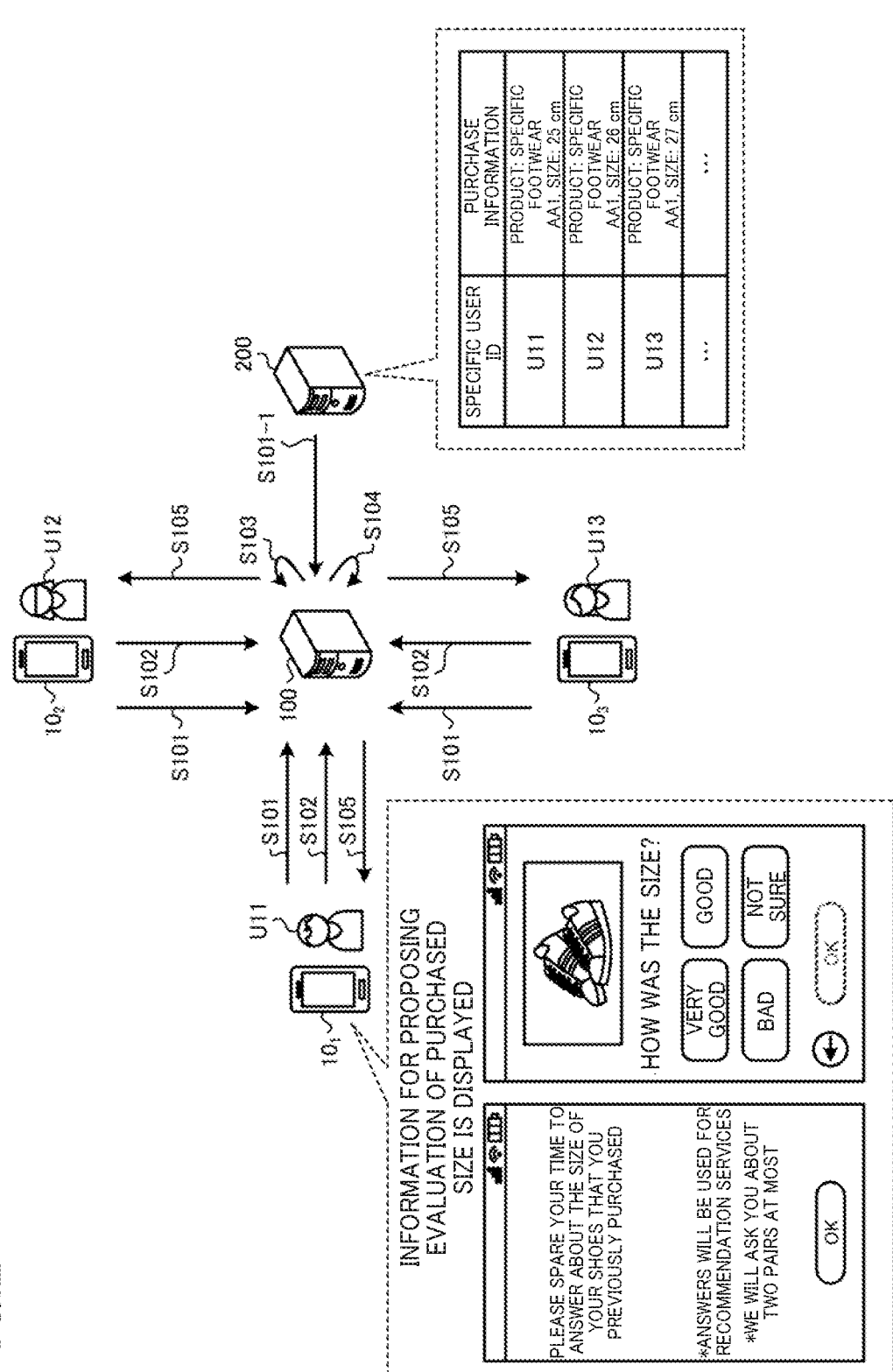
FIG. 2 is a diagram illustrating an example of information processing according to the embodiment.

In FIG. 2, a terminal apparatus 101 is used by a specific user U11, a terminal apparatus 102 is used by a specific user U12, and a terminal apparatus 103 is used by a specific user U13. The terminal apparatuses 101, 102, and 103 are referred to as the "terminal apparatuses 10" when distinction is not necessary in the following description. Furthermore, the specific users U11, U12, and U13 are simply referred to as the "specific users" when distinction is not necessary. In addition, the terminal apparatuses 10 may be referred to as the specific users in the following description. That is, the specific users can be read as the terminal apparatuses 10 in the following description. FIG. 2 shows a case where the specific users are purchasers who have purchased specific footwear.

Figure 10:
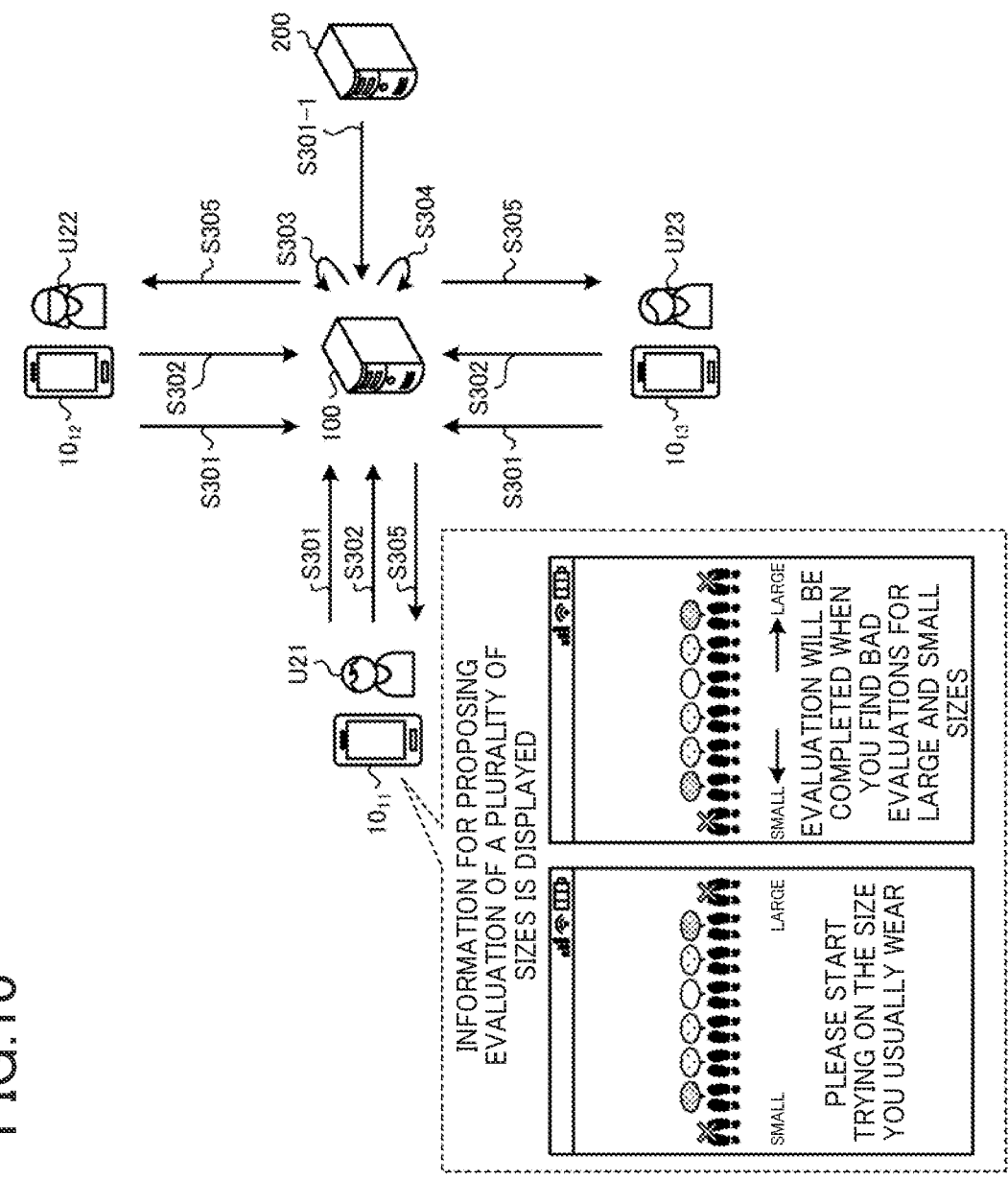
FIG. 10 is a diagram illustrating an example of the information processing according to a modification.

In FIG. 10, a terminal apparatus 1011 is used by a specific user U21, a terminal apparatus 1012 is used by a specific user U22, and a terminal apparatus 1013 is used by a specific user U23. The terminal apparatuses 1011, 1012, and 1013 are referred to as the "terminal apparatuses 10" when distinction is not necessary in the following description. Furthermore, the specific users U21, U22, and U23 are simply referred to as the "specific users" when distinction is not necessary. FIG. 10 shows a case where the specific users are sellers who sell the specific footwear.

The information processing apparatus 100 is an information processing apparatus for promoting further improvement of service according to a foot size of a target user based on evaluations of a plurality of sizes, and is implemented, for example, by a server apparatus or a cloud system. For example, the information processing apparatus 100 has functions of identifying an allowable range of the sizes that is allowable for each of the specific users based on evaluation information on the plurality of sizes evaluated by the specific users, and providing the service according to the foot size of the target user based on a correlation (hereinafter referred to as a "first correlation" as appropriate) between the identified allowable ranges and the foot sizes of the specific users.

The management server 200 is an information processing apparatus for managing a predetermined online mall that provides the specific footwear, and is implemented, for example, by a server apparatus or a cloud system. For example, the management server 200 has a function of providing a questionnaire for the specific users who have purchased the specific footwear. Furthermore, the management server 200 may be an information processing apparatus for managing respective physical stores that provide the specific footwear to be proposed by the information processing apparatus 100. For example, the management server 200 may have a function of providing information on the specific footwear provided at the respective physical stores. In the following embodiment, the specific footwear may be any type of footwear. For example, the specific footwear may be sneakers, sandals, boots, pumps, dress shoes, running shoes, or the like.

In FIG. 1, the terminal apparatus 10 and the information processing apparatus 100 are configured as separate apparatuses. However, the terminal apparatus 10 and the information processing apparatus 100 may be configured integrally. In addition, in FIG. 1, the information processing apparatus 100 and the management server 200 are configured as separate apparatuses. However, the information processing apparatus 100 and the management server 200 may be configured integrally.

2. Example of Information Processing

FIG. 2 is a diagram illustrating an example of information processing of the information processing system 1 according to the embodiment. In FIG. 2, the evaluations are received from the specific users via the terminal apparatuses 10. FIG. 2 illustrates a case where the evaluations are received from the specific users U11 to U13, as the specific users who have purchased specific footwear AA1. However, a number of specific users is not particularly limited. The number of specific users is not limited to the three of the specific users U11 to U13, but may be one, two, four or more, for example. Furthermore, in the following embodiment, the evaluation is made based on how the specific user feels about the size, such as that the footwear is too tight, too loose, painful, or a particular part of a foot protrudes from (comes out of) the specific footwear. For example, the evaluation includes an evaluation such as that the size is suitable (fits), or that the size is not suitable (does not fit). Meanwhile in the following embodiment, the target user may be anyone, and may be the specific user, of course. For example, when a specific user who purchased the specific footwear in the past is trying to purchase the same specific footwear in a different size, the specific user can be the target user.

The information processing apparatus 100 acquires evaluation information on a plurality of sizes of the specific footwear AA1 evaluated by the specific users U11 to U13 (step S101). For example, the information processing apparatus 100 acquires the evaluation information by the specific user U11 who has purchased the specific footwear AA1 in size 25 cm, the evaluation information by the specific user U12 who has purchased the specific footwear AA1 in size 26 cm, and the evaluation information by the specific user U13 who has purchased the specific footwear AA1 in size 27 cm. To give a concrete example, the information processing apparatus 100 acquires the evaluation information by the specific user U11 that evaluates the specific footwear AA1 in size 25 cm as "very good", the evaluation information by the specific user U12 that evaluates the specific footwear AA1 in size 26 cm as "good", and the evaluation information by the specific user U13 that evaluates the specific footwear AA1 in size 27 cm as "bad". The evaluation information acquired by the information processing apparatus 100 includes information on a combination of the size of the purchased specific footwear and the evaluation by the specific user who has purchased it.

Meanwhile, in the step S101, the information processing apparatus 100 may acquire information for identifying the specific users who have purchased the specific footwear AA1 by accessing the management server 200, for example (step S101-1). The information processing apparatus 100 may also acquire information on the sizes of the specific footwear AA1 that have been purchased by the specific users U11 to U13, for example. Then, the information processing apparatus 100 may provide information for proposing evaluation of the sizes of the purchased specific footwear AA1 for the specific users U11 to U13.

The information processing apparatus 100 acquires measurement information of measuring foot sizes of the specific users U11 to U13 (step S102). For example, the information processing apparatus 100 acquires the measurement information of the specific users U11 to U13 that is identified when the specific users U11 to U13 read code information such as a QR code (registered trademark) with the terminal apparatuses 10 at the time of evaluation of the specific footwear AA1. In this case, the code has been associated with the measurement information beforehand. Furthermore, a timing of measurement of the foot size is not particularly limited in the following embodiment. For example, the information processing apparatus 100 acquires the measurement information measured at the time of the purchase (or evaluation, etc.) of the specific footwear AA1, or at an arbitrary time before the purchase (or evaluation, etc.) of the specific footwear AA1.

In the following embodiment, the foot sizes of the specific users U11 to U13 may be measured by any method. For example, the foot sizes of the specific users U11 to U13 may be measured via a measurement means capable of measuring a three-dimensional size of the foot based on dots (markers) on a mat where the specific user's foot is placed so as to image (photograph) a circumference of the foot by the terminal apparatus 10. Alternatively, for example, when the specific users U11 to U13 are children, imaging may be performed with terminal apparatuses 10 used by parents of the specific users U11 to U13. In such a case, the information processing apparatus 100 may acquire the measurement information of the specific users U11 to U13 from the patents of the specific users U11 to U13.

The information processing apparatus 100 identifies the foot sizes of the specific users U11 to U13 based on the acquired measurement information. In the following embodiment, the information processing apparatus 100 identifies the foot size based on a foot length as an index indicating the foot size.

The information processing apparatus 100 identifies an allowable range of the sizes of the specific footwear AA1 estimated to be allowable for each of the plurality of specific users U11 to U13 based on the acquired evaluation information (step S103). For example, the information processing apparatus 100 identifies the allowable range of the sizes of the specific footwear AA1 estimated to be allowable for each of the specific users U11 to U13 based on a correlation (hereinafter referred to as a "second correlation" as appropriate) between the evaluation information by the specific users U11 to U13 and the foot sizes of the specific users U11 to U13. In particular, the information processing apparatus 100 generates second correlation information indicating the second correlation between the evaluation information by the specific users U11 to U13 and the foot sizes of the specific users U11 to U13, and identifies the allowable range of the sizes of the specific footwear AA1 estimated to be allowable for each of the specific users U11 to U13 based on the generated second correlation information.

Assume that all the foot sizes of the specific users U11 to U13 are 25 cm, the specific user U11 evaluates the purchased specific footwear AA1 in size 25 cm as "very good", the specific user U12 evaluates the purchased specific footwear AA1 in size 26 cm as "good", and the specific user U13 evaluates the purchased specific footwear AA1 in size 27 cm as "bad". In this case, since the specific footwear AA1 in size 27 cm is the only one evaluated as "bad" among the specific users U11 to U13 whose foot sizes are the same, the information processing apparatus 100 identifies the sizes 25 cm to 26 cm evaluated as "very good" or "good" as the allowable range. Then, the information processing apparatus 100 presumes that each of the specific users U11 to U13 feels the sizes in the range from 25 cm to 26 cm "very good" or "good". Accordingly, the information processing apparatus 100 can also presume how the specific users feel about the specific footwear AA1 in the sizes that the specific users have not purchased based on the second correlation.

Since the number of specific users U11 to U13 is three in FIG. 2, the sizes 25 cm to 26 cm are identified as the allowable range. However, when the information processing apparatus 100 receives an evaluation from a specific user U14, for example, the information processing apparatus 100 identifies the allowable range in consideration of the evaluation received from the specific user U14. For example, when the foot size of the specific user U14 is 25 cm, and the specific user U14 evaluates the specific footwear AA1 in size 24 cm purchased by the specific user U14 as "good", the information processing apparatus 100 identifies the sizes 24 cm to 26 cm evaluated as "very good" or "good" as the allowable range. Furthermore, assume that the information processing apparatus 100 receives an evaluation from a specific user U15 in addition to the specific user U14, for example. When the foot size of the specific user U15 is 25 cm, and the specific user U15 evaluates the specific footwear AA1 in size 23 cm purchased by the specific user U15 as "bad", the information processing apparatus 100 identifies the sizes 24 cm to 26 cm evaluated as "very good" or "good" as the allowable range.

FIG. 2 is described with an example where all the foot sizes of the specific users U11 to U13 are 25 cm for the convenience of explanation. However, the foot sizes are not necessarily the same. When the foot sizes of the specific users U11 to U13 are different, the information processing apparatus 100 identifies the allowable range by considering evaluations received from other specific users whose foot sizes are the same as any of the foot sizes of the specific users U11 to U13, for example. For example, when the foot size of the specific user U11 is 24 cm and the foot sizes of the specific users U12 and U13 are 26 cm, the information processing apparatus 100 identifies the allowable range for the specific user U11 based on an evaluation received from another specific user whose foot size is 24 cm, and identifies the allowable range for the specific users U12 and U13 based on an evaluation received from another specific user whose foot size is 26 cm.

The information processing apparatus 100 decides whether a certain size of the specific footwear AA1 is suitable for the foot size of the target user based on the first correlation between the identified allowable ranges and the foot sizes of the specific users U11 to U13 (step S104). For example, assume that the identified allowable range is from 25 cm to 26 cm, and all the foot sizes of the specific users U11 to U13 are 25 cm. In this case, when the certain size of the specific footwear AA1 is 25 cm or 26 cm, and the foot size of the target user is 25 cm, the information processing apparatus 100 decides that the certain size is suitable for the target user. In particular, in the step S104, the information processing apparatus 100 generates the first correlation information indicating the first correlation between the identified allowable ranges and the foot sizes of the specific users U11 to U13, and decides whether the certain size of the specific footwear AA1 is suitable for the foot size of the target user based on the generated first correlation information.

When the certain size of the specific footwear AA1 is other than 25 cm and 26 cm (e.g., 24 cm or 27 cm), and the foot size of the target user is 25 cm, the information processing apparatus 100 decides that the certain size is not suitable for the target user. In other words, the information processing apparatus 100 decides that the certain size is suitable for the target user whose foot size is 25 cm only when the certain size of the specific footwear AA1 is 25 cm or 26 cm. Meanwhile, the certain size of the specific footwear AA1 may be a size selected by any method. For example, the certain size of the specific footwear AA1 may be a size selected by the target user. Furthermore, how much the certain size of the specific footwear AA1 is suitable or unsuitable for the foot size of the target user may be provided by a score indicating a fitting degree.

The information processing apparatus 100 provides the service according to the foot size of the target user based on a decision result (step S105). For example, when the information processing apparatus 100 decides that the certain size of the specific footwear AA1 is suitable for the foot size of the target user, the information processing apparatus 100 provides information for proposing purchase of the certain size. Furthermore, for example, when the information processing apparatus 100 decides that the certain size of the specific footwear AA1 is not suitable for the foot size of the target user, the information processing apparatus 100 provides information stating that the certain size is not suitable for the target user. For example, the information processing apparatus 100 provides information stating that the size is too large, or too small.

The foregoing embodiment has been described with a case where the information processing apparatus 100 identifies the allowable range based on the second correlation, and decides whether the certain size of the specific footwear AA1 is suitable for the foot size of the target user based on the first correlation based on the identified allowable range. Here, the information processing apparatus 100 may decide whether the certain size is suitable for the foot size of the target user by using a model generated based on the second correlation. In particular, the information processing apparatus 100 may generate a model that calculates the score indicating the fitting degree with respect to the foot size of each of the specific users U11 to U13 based on the second correlation.

Here, with regard to the certain size of the specific footwear AA1, the information processing apparatus 100 generates the model based on a curve line indicating a relationship between the foot sizes of the specific users U11 to U13 and the scores of whether the feet in those sizes fit the certain size of the specific footwear AA1. That is, the model is based on a function (e.g., sigmoid function) indicating the second correlation. For example, the model is based on the curve line in which a positive score increases as the certain size is evaluated as larger for the foot size of each of the specific users U11 to U13, a negative score increases as the certain size is evaluated as smaller, and a zero score represents that the certain size is evaluated as suitable. For example, the information processing apparatus 100 may generate a model that calculates a higher positive score as the certain size is evaluated as larger for the foot size of the target user, a higher negative score as the certain size is evaluated as smaller, and a zero score when the certain size is evaluated as suitable.

This function that indicates the second correlation is an example of the second correlation information. However, the second correlation information is not limited to this example. For example, the second correlation information may be a table associating the foot sizes of the specific users U11 to U13 with the evaluation information on suitability. Furthermore, for example, the second correlation information may be a table associating the foot sizes of the specific users U11 to U13 with the scores of the fitting degree. Furthermore, for example, the second correlation information may be a table associating the foot sizes of the specific users U11 to U13 with the evaluations such as too large, too small, or suitable. Furthermore, in the foregoing embodiment, the first correlation information may be a table associating the foot sizes of the specific users U11 to U13 with the allowable ranges, or a function indicating the first correlation.

The information processing apparatus 100 may decide whether the certain size of the specific footwear AA1 is suitable for the foot size of the target user based on the score calculated by inputting the foot size of the target user into the generated model. For example, the information processing apparatus 100 may decide whether the certain size of the specific footwear AA1 is suitable for the foot size of the target user based on whether the calculated score is equal to or higher than a predetermined threshold. In particular, when the information processing apparatus 100 decides that the score indicating the fitting degree is equal to or higher than the predetermined threshold, the information processing apparatus 100 may decide that the certain size of the specific footwear AA1 is suitable for the foot size of the target user. When the information processing apparatus 100 decides that the score indicating the fitting degree is lower than the predetermined threshold, the information processing apparatus 100 may decide that the certain size of the specific footwear AA1 is not suitable for the foot size of the target user.

Meanwhile, the foregoing embodiment has been described with an example where the foot size based on the foot length is used as the index for indicating the foot size for the convenience of explanation. However, this example does not constitute any limitation. For example, the information processing apparatus 100 may identify the foot size based on foot circumference or foot width. The foot circumference and the foot width have various definitions. For example, the foot circumference is defined as a length around an area from a base of a first toe (big toe) to a base of a fifth toe (little toe) or a length around boll joints at the bases of the first toe and fifth toe, and the foot width is defined as a length of a width of a widest portion. However, these examples do not constitute any limitation. Furthermore, for example, the information processing apparatus 100 may identify the foot size based on instep height or heel width.

3. Configuration of Terminal Apparatus

Figure 3:
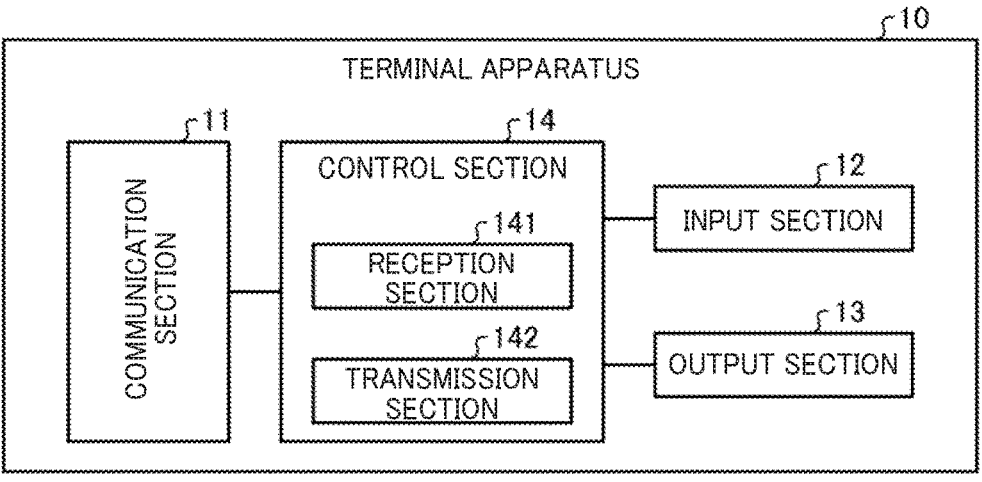
FIG. 3 is a diagram illustrating a configuration example of a terminal apparatus according to the embodiment.

Next, a configuration of the terminal apparatus 10 according to the embodiment is described with reference to FIG. 3. FIG. 3 is a diagram illustrating a configuration example of the terminal apparatus 10 according to the embodiment. As shown in FIG. 3, the terminal apparatus 10 includes a communication section 11, an input section 12, an output section 13, and a control section 14.

(Communication Section 11)

The communication section 11 is implemented by a network interface card (NIC) or the like, for example. The communication section 11 is connected to a predetermined network N by wired or wireless to transmit and receive information to/from the information processing apparatus 100 or the like via the predetermined network N.

(Input Section 12)

The input section 12 receives various operations from the specific user. In the example shown in FIG. 2, the input section receives the various operations from each of the specific users U11 to U13. For example, the input section 12 may receive the various operations from the specific user by a touch-panel function via a display screen. Furthermore, the input section 12 may receive the various operations from buttons disposed on the terminal apparatus 10 or a keyboard or a mouse connected to the terminal apparatus 10.

(Output Section 13)

The output section 13 is a display screen of a tablet terminal or the like implemented by a liquid crystal display, an organic electro-luminescence (EL) display, or the like, and is a display device for displaying various information, for example. For example, the output section 13 displays information received from the information processing apparatus 100.

(Control Section 14)

The control section 14 is, for example, a controller, and is implemented by a central processing unit (CPU), a micro processing unit (MPU), or the like that executes various programs stored in a storage device embedded in the terminal apparatus 10 using a random access memory (RAM) as a work area. For example, the various programs include application programs installed on the terminal apparatus 10. For example, the various programs include an application program to display the information received from the information processing apparatus 100. Furthermore, the control section 14 is implemented by an integrated circuit such as an application specific integrated circuit (ASIC), or a field programable gate array (FPGA), for example.

As shown in FIG. 3, the control section 14 includes a reception section 141 and a transmission section 142, and implements or executes functions of information processing described below.

(Reception Section 141)

The reception section 141 receives various information. The reception section 141 receives the various information from external information processing apparatuses. The reception section 141 receives the various information from other information processing apparatuses such as the information processing apparatus 100. For example, the reception section 141 receives information for evaluating a size of specific footwear purchased by the specific user. Furthermore, for example, the reception section 141 receives information for proposing purchase of a certain size of the specific footwear, or information stating unsuitability of the certain size of the specific footwear.

(Transmission Section 142)

The transmission section 142 transmits various information to external information processing apparatuses. The transmission section 142 transmits the various information to other information processing apparatuses such as the information processing apparatus 100. For example, the transmission section 142 transmits evaluation information of an evaluation received from the specific user. Furthermore, for example, the transmission section 142 transmits measurement information of a foot size of the specific user. For example, the transmission section 142 transmits the measurement information measured via a measurement means capable of measuring a three-dimensional size of a foot based on dots on a mat by imaging a circumference of the foot by the terminal apparatus 10.

4. Configuration of Information Processing Apparatus

Figure 4:
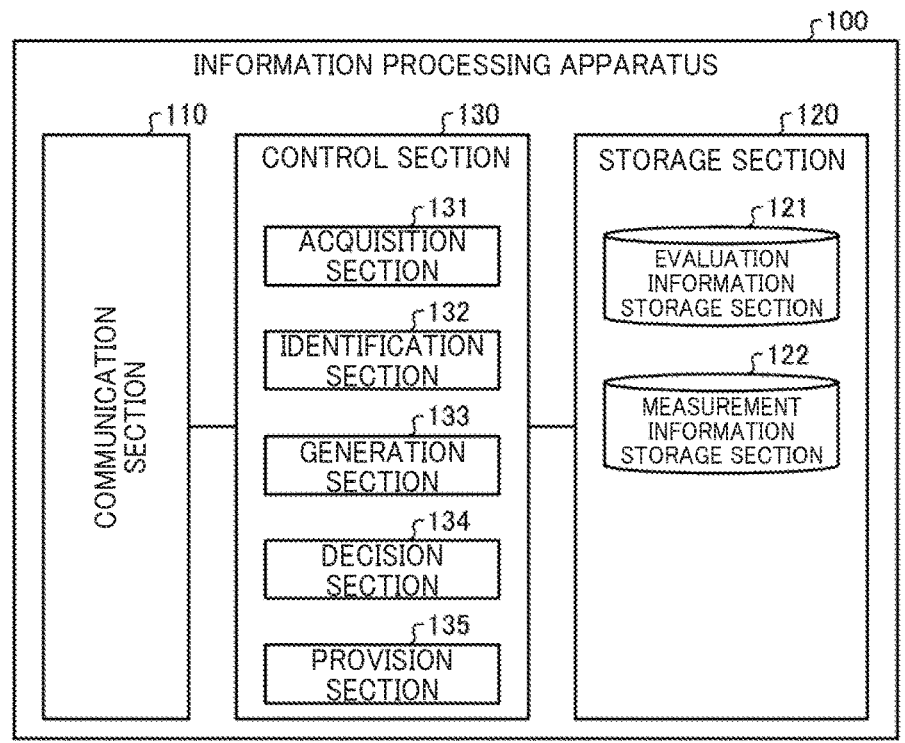
FIG. 4 is a diagram illustrating a configuration example of an information processing apparatus according to the embodiment.

Next, a configuration of the information processing apparatus 100 according to the embodiment is described with reference to FIG. 4. FIG. 4 is a diagram illustrating a configuration example of the information processing apparatus 100 according to the embodiment. As shown in FIG. 4, the information processing apparatus 100 includes a communication section 110, a storage section 120, and a control section 130. The information processing apparatus 100 may include an input section (e.g., a keyboard or a mouse) for receiving various operations from an administrator of the information processing apparatus 100, or a display section (e.g., a liquid crystal display) for displaying various information.

(Communication Section 110)

The communication section 110 is implemented by an NIC or the like, for example. The communication section 110 is connected to a network N by wired or wireless to transmit and receive information to/from the terminal apparatus 10 or the like via the network N.

(Storage Section 120)

The storage section 120 is implemented, for example, by a semiconductor memory element such as a RAM or a flash memory, or a storage device such as a hard disk or an optical disk. As shown in FIG. 4, the storage section 120 includes an evaluation information storage section 121 and a measurement information storage section 122.

The evaluation information storage section 121 stores evaluation information on the size of the specific footwear evaluated by the specific user. Here, FIG. 5 shows an example of the evaluation information storage section 121 according to the embodiment. As shown in FIG. 5, the evaluation information storage section 121 includes items such as "specific user ID", "specific footwear", and "evaluation information".

The "specific user ID" indicates identification information for identifying the specific user. The "specific footwear" indicates the specific footwear evaluated by the specific user. The "evaluation information" indicates the evaluation information evaluated by the specific user. Although FIG. 5 shows examples where conceptual information such as "evaluation information #11" or "evaluation information #12" is stored in the "evaluation information", information such as "size: 25 cm, evaluation: very good" is stored in practice.

That is, FIG. 5 shows an example where the specific footwear evaluated by the specific user identified by the specific user ID "U11" is "specific footwear AA1", and the evaluation information is "evaluation information #11".

The measurement information storage section 122 stores measurement information of the foot size of the specific user. Here, FIG. 6 shows an example of the measurement information storage section 122 according to the embodiment. As shown in FIG. 6, the measurement information storage section 122 includes items such as "specific user ID", "attribute", and "measurement information".

The "specific user ID" indicates identification information for identifying the specific user. The "attribute" indicates an attribute of the specific user (e.g., age or sex). The "measurement information" indicates the measurement information of the foot size of the specific user measured at an arbitrary timing. Although FIG. 6 shows examples where conceptual information such as "measurement information #11" or "measurement information #12" is stored in the "measurement information", information such as "time: July 2021, foot length: 25 cm, foot circumference: 24 cm, foot width: 10 cm, instep height: 6 cm, heel width: 6 cm" is stored in practice.

That is, FIG. 6 shows an example where the attribute of the specific user identified by the specific user ID "U11" is "age: 30 years, sex: male", and the measurement information is "measurement information #11".

(Control Section 130)

The control section 130 is a controller, and is implemented, for example, by a CPU, an MPU, or the like that executes various programs stored in a storage device embedded in the information processing apparatus 100 using a RAM as a work area. Furthermore, the control section 130 is a controller, and is implemented by an integrated circuit such as an ASIC or an FPGA, for example.

As shown in FIG. 4, the control section 130 includes an acquisition section 131, an identification section 132, a generation section 133, a decision section 134, and a provision section 135, and implements or executes functions of information processing described below. An internal configuration of the control section 130 is not limited to the configuration shown in FIG. 4, and may be any other configuration if it can perform the information processing described later.

(Acquisition Section 131)

The acquisition section 131 acquires various information. The acquisition section 131 acquires the various information from external information processing apparatuses. The acquisition section 131 acquires the various information from other information processing apparatuses such as the terminal apparatus 10.

The acquisition section 131 acquires the various information from the storage section 120. The acquisition section 131 acquires the various information from the evaluation information storage section 121 and the measurement information storage section 122. The acquisition section 131 also stores the acquired various information into the storage section 120. The acquisition section 131 stores the various information into the evaluation information storage section 121 and the measurement information storage section 122.

The acquisition section 131 acquires evaluation information on a plurality of sizes of the specific footwear. For example, the acquisition section 131 acquires the evaluation information on a certain size evaluated by the specific user who has purchased the specific footwear. For example, the acquisition section 131 acquires the evaluation information on a first size of the specific footwear evaluated by a first specific user, and the evaluation information on a second size of the specific footwear evaluated by a second specific user. The first size may be the same as the second size.

The acquisition section 131 acquires measurement information of the foot size of the specific user.

(Identification Section 132)

The identification section 132 identifies an allowable range of the sizes of the specific footwear that is allowable for the specific user based on the evaluation information acquired by the acquisition section 131. For example, the identification section 132 identifies the allowable range of the sizes of the specific footwear estimated to be allowable for each of a plurality of users based on a second correlation between the evaluation information acquired by the acquisition section 131 and the foot sizes of the specific users. For example, the identification section 132 identifies a first allowable range as the allowable range of the sizes estimated to be allowable for a first specific user, and a second allowable range as the allowable range of the sizes estimated to be allowable for a second specific user. The first allowable range may be the same as the second allowable range.

The identification section 132 identifies the allowable range of the sizes estimated to be allowable for each of the plurality of users based on scores that are calculated based on the second correlation and indicate fitting degrees of the feet of the plurality of users with respect to the plurality of sizes. For example, the identification section 132 identifies the allowable range of the sizes estimated to be allowable for each of the plurality of users based on the scores calculated using a model generated based on the second correlation.

The identification section 132 identifies the foot sizes of the specific users based on the measurement information acquired by the acquisition section 131.

(Generation Section 133)

The generation section 133 generates a model that calculates the scores indicating the fitting degrees of the foot sizes of the specific users with respect to the plurality of sizes based on the second correlation. For example, with regard to a certain size of the specific footwear, the generation section 133 generates a model that has learned a relationship between the foot sizes of the specific users and the scores of whether the feet in those sizes fit the certain size of the specific footwear.

The generation section 133 generates first correlation information indicating a first correlation between the allowable ranges identified by the identification section 132 and the foot sizes of the specific users. Furthermore, the generation section 133 generates second correlation information indicating a second correlation between the evaluation information by the specific users and the foot sizes of the specific users.

(Decision Section 134)

The decision section 134 decides whether the certain size of the specific footwear is suitable for the foot size of the target user based on the first correlation between the allowable ranges identified by the identification section 132 and the foot sizes of the specific users. For example, assume that a certain identified allowable range is from 25 cm to 26 cm, and the foot sizes of the specific users are 25 cm. In this case, when the certain size of the specific footwear is 25 cm or 26 cm, and the foot size of the target user is 25 cm, the decision section 134 decides that the certain size is suitable for the target user.

The decision section 134 decides whether the certain size of the specific footwear is suitable for the foot size of the target user based on the score calculated using the model generated by the generation section 133. For example, the decision section 134 decides whether the calculated score is equal to or higher than a predetermined threshold. Then, the decision section 134 decides whether the certain size of the specific footwear is suitable for the foot size of the target user based on whether the calculated score is equal to or higher than the predetermined threshold.

(Provision Section 135)

The provision section 135 provides (transmits) service according to the foot size of the target user. For example, the provision section 135 provides the service according to the foot size of the target user based on a decision result by the decision section 134. For example, the provision section 135 provides information for proposing purchase of the certain size of the specific footwear, or information stating unsuitability of the certain size of the specific footwear.

The provision section 135 provides information for the specific user who has purchased the specific footwear for proposing evaluation of the size of the purchased specific footwear.

5. Configuration of Management Server

Figures 7, 8:
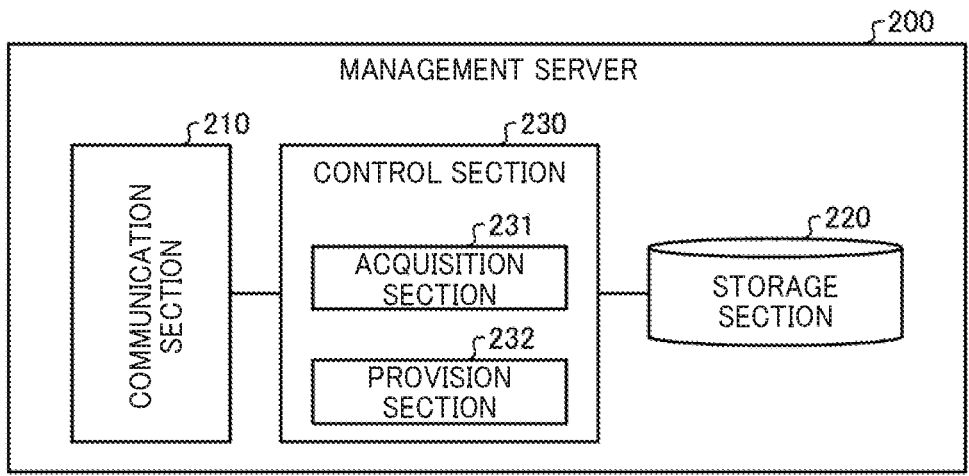
FIG. 7 is a diagram illustrating a configuration example of a management server according to the embodiment.
FIG. 8 is a table illustrating an example of a product information storage section according to the embodiment.

Next, a configuration of the management server 200 according to the embodiment is described with reference to FIG. 7. FIG. 7 is a diagram illustrating a configuration example of the management server 200 according to the embodiment. As shown in FIG. 7, the management server 200 includes a communication section 210, a storage section 220, and a control section 230. The management server 200 may include an input section for receiving various operations from an administrator of the management server 200, or a display section for displaying various information.
(Communication Section 210)

The communication section 210 is implemented by an NIC or the like, for example. The communication section 210 is connected to a network N by wired or wireless to transmit and receive information to/from the information processing apparatus 100 or the like via the network N.
(Storage Section 220)

The storage section 220 is implemented, for example, by a semiconductor memory element such as a RAM or a flash memory, or a storage device such as a hard disk or an optical disk.

The storage section 220 stores product information on products provided at a predetermined online mall. Here, FIG. 8 shows an example of the storage section 220 according to the embodiment. As shown in FIG. 8, the storage section 220 includes items such as "product ID" and "product information".

The "product ID" indicates identification information for identifying the product provided at the predetermined online mall. The "product information" indicates the product information of the product provided at the predetermined online mall. Although FIG. 8 shows examples where conceptual information such as "product information #11" or "product information #12" is stored in the "product information", information such as "product: specific footwear AA1, size: 20 cm to 29 cm" is stored in practice.

That is, FIG. 8 shows an example where the product information identified by the product ID "IT11" is "product information #11."
(Control Section 230)

The control section 230 is a controller, and is implemented, for example, by a CPU, an MPU, or the like that executes various programs stored in a storage device embedded in the management server 200 using a RAM as a work area. Furthermore, the control section 230 is a controller, and is implemented by an integrated circuit such as an ASIC or an FPGA, for example.

As shown in FIG. 7, the control section 230 includes an acquisition section 231 and a provision section 232, and implements or executes functions of information processing described below. An internal configuration of the control section 230 is not limited to the configuration shown in FIG. 7, and may be any other configuration if it can perform the information processing described later.
(Acquisition Section 231)

The acquisition section 231 acquires various information. The acquisition section 231 acquires the various information from external information processing apparatuses. The acquisition section 231 acquires the various information from other information processing apparatuses such as the information processing apparatus 100.

The acquisition section 231 acquires the various information from the storage section 220. The acquisition section 231 also stores the acquired various information into the storage section 220.

The acquisition section 231 acquires product information of a product purchased by the specific user. For example, the acquisition section 231 acquires the product information of the product purchased by the specific user that is identified in response to a provision request for the product information transmitted from the information processing apparatus 100.
(Provision Section 232)

The provision section 232 provides (transmits) the product information acquired by the acquisition section 231.

6. Information Processing Flow

Figure 9:
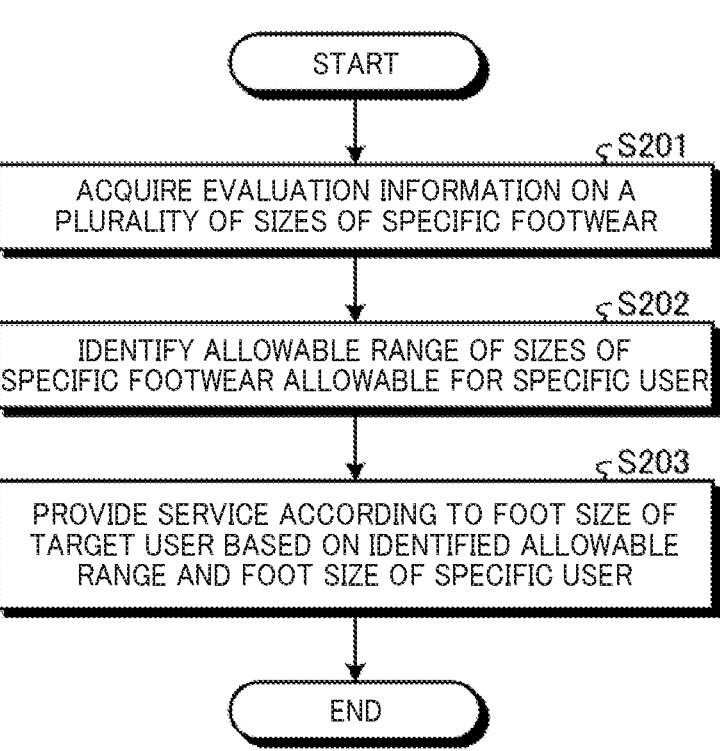
FIG. 9 is a flowchart illustrating an example of the information processing according to the embodiment.

Next, a process of the information processing by the information processing system 1 according to the embodiment is described with reference to FIG. 9. FIG. 9 is a flowchart illustrating the process of the information processing by the information processing system 1 according to the embodiment.

As shown in FIG. 9, the information processing apparatus 100 acquires evaluation information on a plurality of sizes of specific footwear (step S201).

The information processing apparatus 100 identifies an allowable range of sizes of the specific footwear that is allowable for a specific user based on the acquired evaluation information (step S202).

The information processing apparatus 100 provides service according to a foot size of a target user based on the identified allowable range and a foot size of the specific user (step S203).

7. Modification Example

The information processing system 1 according to the foregoing embodiment may be implemented in various different forms other than the foregoing embodiment. The following describes another embodiment of the information processing system 1.

The foregoing embodiment has been described with a case where the evaluations are received from the specific users U11 to U13 as the specific users who have purchased the specific footwear AA1. In other words, the foregoing embodiment has been described with a case where the specific users are purchasers who have purchased the specific footwear. Here, the specific user may be a seller who sells the specific footwear. The following modification is described with a case where evaluations are received from specific users U21 to U23 as the specific users who sell the specific footwear AA1. The same description as the one for FIG. 2 is omitted as appropriate.

With regard to some specific footwear, a number of specific users who have purchased the specific footwear may be small, and a number of evaluations may be insufficient. For example, this applies to a case that the specific footwear is a newly released product. Here, when the number of evaluations is insufficient is, for example, when the number of evaluations is insufficient for generating a model capable of accurate decision in generating the model for deciding whether the certain size of the specific footwear is suitable for the foot size of the target user. Accordingly, if a certain specific user wear and evaluate the specific footwear in all sizes, the accurate decision can be made even if the number of evaluations is insufficient.

At the same time, it is difficult to have the certain specific user wear and evaluate the specific footwear in all sizes. Therefore, for example, with regard to the specific footwear that does not have such evaluation information by the certain specific user, the evaluation information by the specific users who have purchased the specific footwear is used to make the accurate decision.

The following modification is described with a case where, as an example of the certain specific user, a specific user who has expertise in sales of the footwear including the specific footwear AA1 wears and evaluates the specific footwear AA1 in all sizes. The specific user who has the expertise in the sales of the footwear including the specific footwear AA1 is a salesperson of a store that sells the footwear, for example. Meanwhile, receiving the evaluation by the specific user who has the expertise in the sales of the footwear, such as the salesperson of the store, increases evaluation reliability as compared with the evaluation by an ordinary specific user without the expertise, and thus more accurate decision can be made. Furthermore, the following modification is described with the specific user who has the expertise in the sales of the footwear including the specific footwear AA1 as an example of the certain specific user. However, this example does not constitute any limitation. For example, the specific user may be a person who has a predetermined relationship with the management server 200.

FIG. 10 is a diagram illustrating an example of information processing of the information processing system 1 according to the embodiment. The following modification is described with an example where all sizes of the specific footwear AA1 to be worn and evaluated by the specific user are nine sizes from 20 cm to 28 cm.

The information processing apparatus 100 acquires evaluation information on a plurality of sizes of the specific footwear AA1 evaluated by the specific users U21 to U23 (step S301). For example, the information processing apparatus 100 acquires the evaluation information by the specific user U21 that evaluates the specific footwear AA1 in size 20 cm as "bad", the specific footwear AA1 in size 21 cm as "bad", the specific footwear AA1 in size 22 cm as "bad", the specific footwear AA1 in size 23 cm as "good", the specific footwear AA1 in size 24 cm as "very good", the specific footwear AA1 in size 25 cm as "good", the specific footwear AA1 in size 26 cm as "bad", the specific footwear AA1 in size 27 cm as "bad", and the specific footwear AA1 in size 28 cm as "bad".

Meanwhile, in the step S301, the information processing apparatus 100 may acquire information for identifying the specific users who sell the specific footwear AA1 by accessing the management server 200, for example (step S301-1). Then, the information processing apparatus 100 may provide information for proposing evaluation of the plurality of sizes of the specific footwear AA1 for the specific users U21 to U23.

The information processing apparatus 100 acquires measurement information of measuring foot sizes of the specific users U21 to U23 (step S302). The information processing apparatus 100 identifies the foot sizes of the specific users U21 to U23 based on the acquired measurement information.

The information processing apparatus 100 identifies an allowable range of the sizes of the specific footwear AA1 allowable for each of the plurality of specific users U21 to U23 based on the acquired evaluation information (step S303). For example, according to the foregoing example of the evaluations evaluated by the specific user U21, the information processing apparatus 100 identifies the three sizes from 23 cm to 25 cm evaluated by the specific user U21 as "very good" or "good" as the allowable range for the specific user U21.

The following describes processing for identifying the allowable range with examples of display information displayed on the terminal apparatuses 10 for the specific users U21 to U23.

The information processing apparatus 100 transmits information for displaying information on the terminal apparatus 10 with content such as, "Please start trying on the size you usually wear". In this way, as the size proposed for the evaluation at first, the information processing apparatus 100 transmits information for proposing that the specific user evaluate the footwear from the size estimated to be most suitable for each of the specific users U21 to U23. Meanwhile, a code such as a QR code (registered trademark) may be prepared for each of the nine sizes of the specific footwear AA1 to be evaluated so that the information processing apparatus 100 can identify which size of the specific footwear AA1 is evaluated when the specific users U21 to U23 read the code.

The information processing apparatus 100 transmits information for displaying information on the terminal apparatus 10 with content such as, "Please separately evaluate the sizes of the right and left shoes you try on". In this way, the information processing apparatus 100 transmits information for proposing that the specific user evaluate each of the right and left shoes of each of the nine sizes of the specific footwear AA1. The foregoing embodiment has been described with an example where the information processing apparatus 100 receives the evaluation of each of the sizes such as "very good", "good", or "bad". However, the information processing apparatus 100 may receive the evaluation of each of the right and left shoes of each of the sizes such as "very good", "good", or "bad".

The information processing apparatus 100 transmits information for displaying information on the terminal apparatus 10 with content such as, "For evaluation, please select one from very good, good, and bad". In this way, the information processing apparatus 100 transmits information for proposing that the specific user make the evaluation by selecting one from "very good", "good", and "bad". The foregoing embodiment has been described with an example where the specific user selects one from "very good", "good," and "bad" to determine the evaluation. However, this example does not constitute any limitation. For example, the information processing apparatus 100 may receive numbers from 1 to 5 directly input by the specific users U21 to U23 as the evaluations. In this way, the information processing apparatus 100 may transmit information for proposing that the specific user make the evaluation by directly inputting an evaluation degree.

The information processing apparatus 100 transmits information for displaying information on evaluation criteria that are criteria of the evaluation on the terminal apparatus 10. For example, as an evaluation criterion for "very good", the information processing apparatus 100 transmits information for displaying information with content such as, "An evaluation criterion for 'very good' is a size that has no disturbance or problem in length, width, height, etc.". Furthermore, for example, as an evaluation criterion for "good", the information processing apparatus 100 transmits information for displaying information with content such as, "An evaluation criterion for 'good' is a size that has some disturbance in length, width, height, etc., though it is not too severe to stop you purchasing it". Furthermore, for example, as an evaluation criterion for "bad", the information processing apparatus 100 transmits information for displaying information with content such as, "An evaluation criterion for 'bad' is a size that is too small or too large to purchase". These evaluation criteria are only examples and do not constitute any limitation.

The identification section 132 identifies the allowable range of the sizes allowable for each of the specific users U21 to U23 based on the evaluation information of the evaluation selected from the evaluations based on the predetermined evaluation criteria.

For the evaluation of each of the sizes, the information processing apparatus 100 transmits information for displaying information on the terminal apparatus 10 with content such as, "Please make sure to tie your shoelaces up to the top.", or "Please try the shoes on and walk for a short distance to see how it feels". In this way, the information processing apparatus 100 transmits information to each of the specific users U21 to U23 for proposing that the specific user make the evaluation under a predetermined condition. Accordingly, the information processing apparatus 100 allows each of the specific users U21 to U23 to properly make the evaluation under the same condition.

The information processing apparatus 100 transmits information for displaying information on the terminal apparatus 10 with content such as, "Please try the shoes on one by one until the size becomes too small to purchase". In this way, the information processing apparatus 100 transmits information for proposing that the specific user make the evaluation by trying a next smallest size one by one from the size estimated to be most suitable for each of the specific users U21 to U23 to the size that is too small to purchase.

The information processing apparatus 100 transmits information for displaying information on the terminal apparatus 10 with content such as, "Similarly, please try the shoes on one by one until the size becomes too large to purchase". In this way, the information processing apparatus 100 transmits information for proposing that the specific user make the evaluation by trying a next largest size one by one from the size estimated to be most suitable for each of the specific users U21 to U23 to the size that is too large to purchase.

The identification section 132 identifies the allowable range of the sizes allowable for each of the specific users U21 to U23 based on the evaluation information on the plurality of sizes specified and evaluated in a predetermined order. For example, the identification section 132 identifies the allowable range of the sizes allowable for each of the specific users U21 to U23 based on the evaluation information evaluated in a descending order or an ascending order of the size from the size estimated to be most suitable for each of the specific users U21 to U23.

The information processing apparatus 100 transmits information for displaying information on the terminal apparatus 10 with content such as, "Evaluation will be completed when you identify 'bad' evaluations for large and small sizes". In this way, the information processing apparatus 100 transmits information for proposing that the specific user make the evaluation until upper and lower limits of the allowable size for each of the specific users U21 to U23 are identified. Then, the information processing apparatus 100 identifies a range of sizes from the lower limit to the upper limit as the allowable range for each of the specific users U21 to U23.

Here, for example, assume that the sizes 23 cm to 25 cm are identified as the allowable range of the specific footwear AA1 for the specific user U21, the sizes 24 cm to 26 cm are identified as the allowable range of the specific footwear AA1 for the specific user U22, the sizes 25 cm to 27 cm are identified as the allowable range of the specific footwear AA1 for the specific user U23. Furthermore, assume that the foot size of the specific user U21 is 24 cm, the foot size of the specific user U22 is 25 cm, and the foot size of the specific user U23 is 26 cm.

The information processing apparatus 100 decides whether the certain size of the specific footwear AA1 is suitable for the foot size of the target user based on the first correlation between the identified allowable ranges and the respective foot sizes of the specific users U21 to U23 (step S304). For example, when the foot size of the target user is 24 cm, the information processing apparatus 100 decides that the certain size is suitable for the target user when the certain size of the specific footwear AA1 is one of the sizes from 23 cm to 25 cm. Furthermore, for example, when the foot size of the target user is 25 cm, the information processing apparatus 100 decides that the certain size is suitable for the target user when the certain size of the specific footwear AA1 is one of the sizes from 24 cm to 26 cm. Furthermore, for example, when the foot size of the target user is 26 cm, the information processing apparatus 100 decides that the certain size is suitable for the target user when the certain size of the specific footwear AA1 is one of the sizes from 25 cm to 27 cm.

8. Advantageous Effects

As described above, an information processing apparatus 100 according to the embodiment includes an identification section 132, a generation section 133, and a provision section 135. The identification section 132 identifies an allowable range of sizes of specific footwear that is allowable for at least one specific user based on evaluation information on a plurality of sizes of the specific footwear evaluated by the specific user. The generation section 133 generates first correlation information indicating a first correlation between the allowable range identified by the identification section 132 and a foot size of the specific user. The provision section 135 provides service according to a foot size of a target user based on the first correlation information generated by the generation section 133.

As a result, the information processing apparatus 100 according to the embodiment can provide the service according to the foot size of the target user based on evaluations of the plurality of sizes.

Furthermore, the generation section 133 generates second correlation information indicating a second correlation between the evaluations by a plurality of users who have purchased the specific footwear, as the at least one specific user, and foot sizes of the plurality of users. For example, the identification section 132 identifies the allowable range of the sizes of the specific footwear estimated to be allowable for each of the plurality of users based on the second correlation information generated by the generation section 133.

As a result, the information processing apparatus 100 according to the embodiment can properly identify the allowable range of the sizes of the specific footwear estimated to be allowable for each of the plurality of users. For example, the information processing apparatus 100 according to the embodiment can also properly presume how the specific user feels about the specific footwear in the sizes that the specific user has not purchased.

Furthermore, the identification section 132 identifies the allowable range based on scores that are calculated based on the second correlation information and indicate fitting degrees of the feet of the plurality of users with respect to the plurality of sizes.

As a result, the information processing apparatus 100 according to the embodiment can properly identify the allowable range of the sizes of the specific footwear estimated to be allowable for each of the plurality of users. For example, the information processing apparatus 100 according to the embodiment can also properly presume how the specific user feels about the specific footwear in the sizes that the specific user has not purchased.

Furthermore, the provision section 135 provides the service based on a decision result of whether a certain size of the specific footwear is suitable for the foot size of the target user.

As a result, the information processing apparatus 100 according to the embodiment can provide the service based on whether the certain size of the plurality of sizes is suitable for the feet of the target user.

Furthermore, the identification section 132 identifies the allowable range based on the evaluation information that the specific user has evaluated by selecting from evaluations based on a predetermined evaluation criterion.

As a result, the information processing apparatus 100 according to the embodiment allows each of the specific users to properly make the evaluation under the same condition.

Furthermore, the identification section 132 identifies the allowable range based on the evaluation information on the plurality of sizes specified and evaluated in a predetermined order.

As a result, the information processing apparatus 100 according to the embodiment allows each of the specific users to properly make the evaluation under the same condition.

Furthermore, the specific user is a user who has expertise in sales of footwear including the specific footwear.

As a result, the information processing apparatus 100 according to the embodiment receives the evaluation from the specific user who has the expertise in the sales of the footwear, which increases evaluation reliability as compared with the evaluation from an ordinary specific user without the expertise, and thus more accurate decision can be made.

9. Hardware Configuration

Figure 11:
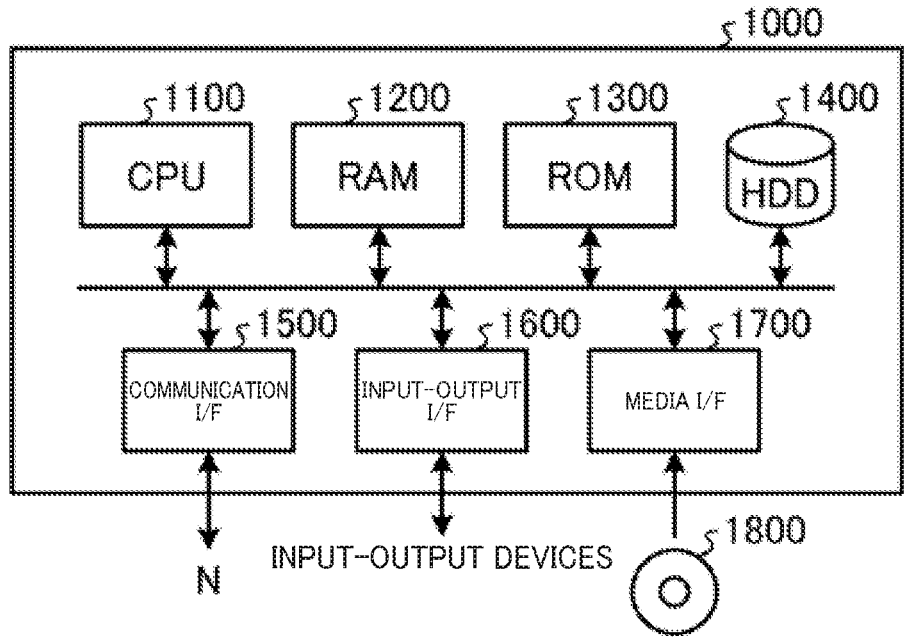
FIG. 11 is a diagram illustrating a hardware configuration of an example of a computer that implements functions of the information processing apparatus.

Furthermore, the terminal apparatus 10, the information processing apparatus 100, and the management server 200 according to the embodiment as described above are implemented by a computer 1000 having a configuration shown in FIG. 11, for example. FIG. 11 is a diagram illustrating a hardware configuration of an example of the computer implementing functions of the terminal apparatus 10, the information processing apparatus 100, and the management server 200. The computer 1000 includes a CPU 1100, a RAM 1200, a ROM 1300, an HDD 1400, a communication interface (I/F) 1500, an input-output interface (I/F) 1600, and a media interface (I/F) 1700.

The CPU 1100 operates based on programs stored in the ROM 1300 or the HDD 1400 to control respective sections. The ROM 1300 stores a boot program executed by the CPU 1100 to boot the computer 1000, programs dependent on the hardware of the computer 1000, or the like.

The HDD 1400 stores programs executed by the CPU 1100, data used by these programs, or the like. The communication interface 1500 receives data from other devices via a predetermined communication network to transmit the data to the CPU 1100, and transmits data generated by the CPU 1100 to other devices via the predetermined communication network.

The CPU 1100 controls an output device such as a display or a printer, and an input device such as a keyboard or a mouse via the input-output interface 1600. The CPU 1100 acquires data from the input device via the input-output interface 1600. Furthermore, the CPU 1100 outputs the generated data to the output device via the input-output interface 1600.

The media interface 1700 reads out programs or data stored in a recording medium 1800, and provides the programs or data to the CPU 1100 via the RAM 1200. The CPU 1100 loads these programs from the recording medium 1800 to the RAM 1200 via the media interface 1700, and executes the loaded programs. The recording medium 1800 includes, for example, an optical recording medium such as a digital versatile disc (DVD) or a phase-change-rewritable disk (PD), a magneto-optical recording medium such as a magneto-optical (MO) disk, a tape medium, a magnetic recording medium, a semiconductor memory, or the like.

For example, when the computer 1000 functions as the terminal apparatus 10, the information processing apparatus 100, and the management server 200 according to the embodiment, the CPU 1100 of the computer 1000 executes the programs loaded on the RAM 1200 to implement functions of the control sections 14, 130, and 230.

Although the CPU 1100 of the computer 1000 reads out these programs from the recording medium 1800 to execute, the computer may acquire these programs from other devices via a predetermined network, as an alternative example.

10. Others

Furthermore, among the processing described in the embodiment above, the processing described to be performed automatically can be entirely or partly performed manually, or the processing described to be performed manually can be entirely or partly performed automatically by known methods. Moreover, the processing processes, specific names, information including various data or parameters described or shown in the foregoing description or drawings can be changed arbitrarily unless otherwise specified. For example, various information shown in the drawings is not limited to the information shown in the drawings.

Furthermore, the components of the apparatuses shown in the drawings are function concepts, and do not have to be physically configured as shown in the drawings. That is, a specific form of dispersion/integration of the apparatuses is not limited to the forms shown in the drawings, and the apparatuses can be entirely or partly configured to be functionally or physically dispersed/integrated in any unit according to various loads, usage conditions, or the like.

Furthermore, the embodiments described above can be combined as appropriate within a range not causing any contradiction in the processing content.

As described above, some of the embodiments of the present application have been described in detail based on the drawings, but these are examples, and the present disclosure can be implemented in other modes that have been modified and improved in various ways based on the knowledge of those skilled in the art, including the aspects described in the section of the summery of the invention.

Furthermore, the "section", "module", or "unit" described above can be read as a "means" or "circuit". For example, the acquisition section can be read as an acquisition means or an acquisition circuit.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

The invention claimed is:

1. A system comprising:
a mat having position markers distributed thereon;
a terminal apparatus comprising:
  a display,
  a first network interface configured to communicate via a network, and
  at least one first processor configured to:
    capture images of a specific user's foot positioned on the mat,
    transmit measurement information of the specific user's foot based on the captured images via the first network interface,
    transmit evaluation information on a plurality of sizes of specific footwear evaluated by the specific user via the first network interface,
    receive service information via the first network interface, and
    cause the display to display the service information; and
an information processing apparatus comprising:
  a second network interface configured to communicate with the terminal apparatus via the network,
  a memory configured to store measurement information and evaluation information, and
  at least one second processor or circuit configured to:
    receive, via the second network interface, the measurement information and the evaluation information from the terminal apparatus,
    store the measurement information and the evaluation information in the memory,
    identify a foot size of the specific user based on the measurement information,
    identify an allowable range of sizes of the specific footwear that is allowable for the specific user based on the evaluation information;
    generate first correlation information indicating a first correlation between the allowable range and the foot size of the specific user, and
    provide service according to a foot size of a target user based on the first correlation information by transmitting the service information to the terminal apparatus via the second network interface.

2. The system according to claim 1, wherein the at least one second processor or circuit is further configured to:
generate second correlation information indicating a second correlation between evaluations by a plurality of users who have purchased the specific footwear, as the at least one-specific user, and foot sizes of the plurality of users, and
identify the allowable range of the sizes of the specific footwear estimated to be allowable for each of the plurality of users based on the second correlation information.

3. The system according to claim 2, wherein the at least one second processor or circuit is further configured to:
identify the allowable range based on scores that are calculated based on the second correlation information and indicate fitting degrees of feet of the plurality of users with respect to the plurality of sizes.

4. The system according to claim 1, wherein the at least one second processor or circuit is further configured to:
provide the service based on a decision result of whether a certain size of the specific footwear is suitable for the foot size of the target user.

5. The system according to claim 3, wherein the at least one second processor or circuit is further configured to:
provide the service based on a decision result of whether a certain size of the specific footwear is suitable for the foot size of the target user.

6. The system according to claim 1, wherein the at least one second processor or circuit is further configured to:
identify the allowable range based on the evaluation information on the plurality of sizes specified and evaluated in a predetermined order.

7. The system according to claim 5, wherein the at least one second processor or circuit is further configured to:
identify the allowable range based on the evaluation information on the plurality of sizes specified and evaluated in a predetermined order.

8. The system according to claim 1, wherein
the specific user is a user who has expertise in sales of footwear including the specific footwear.

9. The system according to claim 7, wherein
the specific user is a user who has expertise in sales of footwear including the specific footwear.

10. The system according to claim 1, wherein the evaluation information comprises evaluation information received from the specific user on a suitability of the plurality of sizes of the specific footwear.

\* \* \* \* \*